United States Patent

[11] 3,631,694

[72] Inventor Joseph O. Teroux
 180 Pine St., Holyoke, Mass. 01040
[21] Appl. No. 25,400
[22] Filed Apr. 3, 1970
[45] Patented Jan. 4, 1972

[54] SECURITY DEVICE FOR LOCKING GASOLINE ACCELERATOR PEDAL OF AUTOMOBILE
 4 Claims, 4 Drawing Figs.
[52] U.S. Cl. ................................................. 70/202, 70/181, 74/526
[51] Int. Cl. ..................................................... B60r 25/04
[50] Field of Search ............................................. 70/192, 198, 199, 200, 201, 202, 203, 254, 237, 238

[56] References Cited
UNITED STATES PATENTS
| | | | |
|---|---|---|---|
| 2,330,536 | 9/1943 | Zimmermann | 70/199 |
| 2,336,829 | 12/1943 | Zimmermann et al. | 70/199 |
| 1,516,482 | 11/1924 | Gray | 70/202 |
| 2,832,232 | 4/1958 | Dow | 70/202 UX |

FOREIGN PATENTS
261,270  6/1961  Australia .................... 70/237

Primary Examiner—Albert G. Craig, Jr.
Attorney—Leonard S. Michelman

ABSTRACT: This invention is concerned with a device for preventing the theft of an automobile. A bar is placed beneath the accelerator foot pedal. The bar is connected to a vertical ratchet which elevates the bar upwardly and downwardly. The vertical ratchet controls the height of the bar. The ratchet is secured into a fixed position by a locking means. The locking means is controlled by a key mechanism. When the user of an automobile desires to leave the vehicle locked, he pulls the vertical ratchet upwardly so that the bar is against the foot pedal at its top position and turns the key engaging the ratchet teeth into a locked position. The user of the automobile cannot push the gasoline pedal downwardly because the bar is now locked into a stationary position so that the gasoline pedal cannot be pushed downwardly; and, accordingly, no gasoline can be fed to the motor.

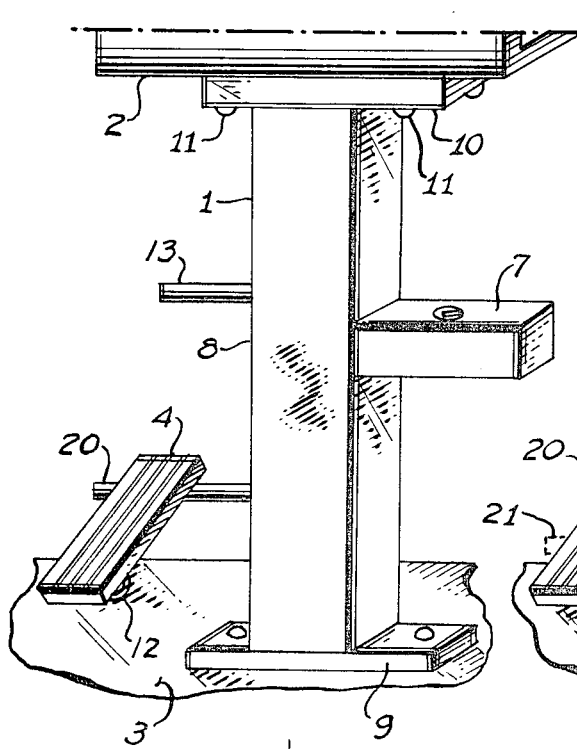
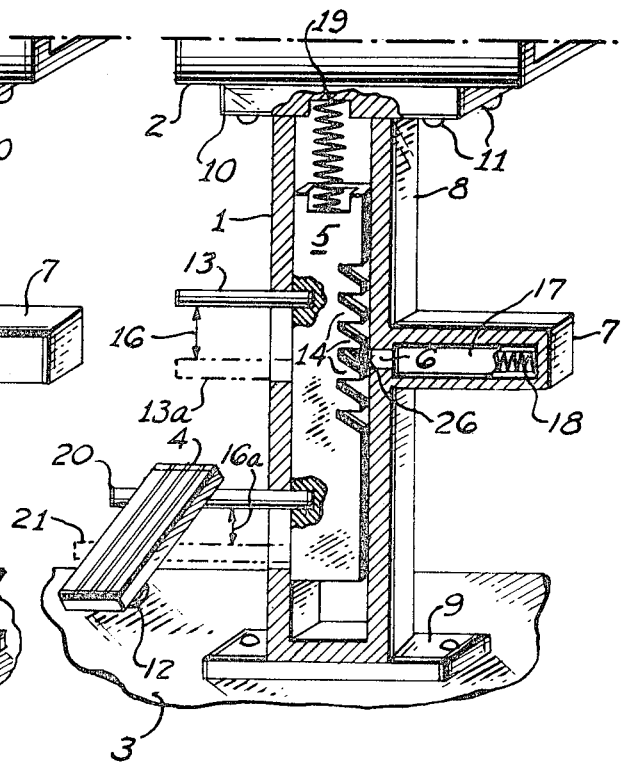
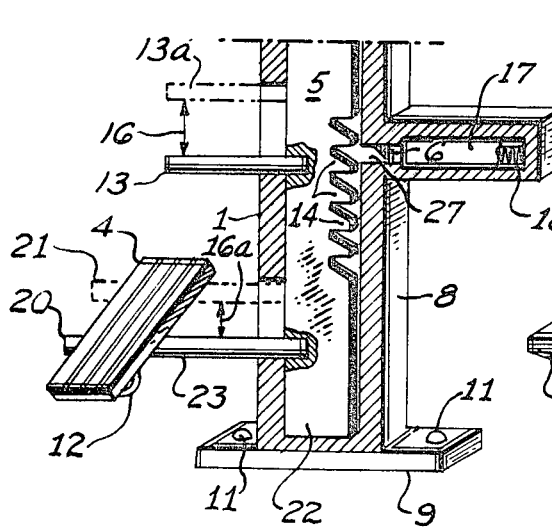
Joseph O. Teroux
INVENTOR.

SECURITY DEVICE FOR LOCKING GASOLINE ACCELERATOR PEDAL OF AUTOMOBILE

SPECIFICATION

This invention is concerned with a device for preventing and impeding the theft of an automobile.

In the larger cities, one of the perplexing problems has been the theft of automobiles by organized crime and by young vandals. There are master keys which permit the turning of the ignition. There are cables with jumper attachments for cutting out the switch so that the motor will become energized from the electrical source. Criminals have conceived other ways to overcome the obstacles of turning on the ignition switch.

This invention is concerned with a new approach. A device is employed that prevents the gasoline control throttle from being operated.

It is a purpose of the within invention to provide a device for impeding the theft of an automobile.

It is another object of the within invention to provide means for preventing the unauthorized use of an automobile.

It is still a further object of the within invention to provide a device that prevents the operation of the gasoline foot pedal or accelerator.

It is still another object of the within invention to provide a device that will control the maximum speed of the motor vehicle by controlling the position of the foot pedal.

These and other objects are obtained by the use of the mechanism that comprises a bar which fits beneath the pedal of the accelerator which can be locked into an elevated position, thus preventing the pedal from being pushed downwardly by the operator of the motor vehicle.

For a more detailed description of this invention, reference is made to the detailed specifications and to the accompanying drawings in which:

FIG. 1 is a front elevational view in perspective of the device mounted within the area of the foot pedal of an automobile.

FIG. 2 is a view of FIG. 1 showing the details of the various component parts within the housing, and the bar in the elevated position.

FIG. 3 is an exploded view showing the details of construction of the lower portion of the arrangement of the mechanism within the housing partially in section, and the bar in a lowered position.

FIG. 4 is a perspective view showing the location of the key for locking the ratchet teeth into position.

The main body 1 is mounted on a foot base 9. Foot base 9 has openings on each side thereof in which each opening is in the flange of the foot base 9 wherein rivets or bolts 11 pass therethrough to mount the device into the floorboard 3 of the automobile. Similarly, at the upper portion of the housing 1 is the dashboard support 10. In the flanges of support 10, are the rivets or bolts 11, securing the upper portion of the housing 1 to the dashboard 2 of the automobile. A bar 20, which is hereinafter referred to as the foot pedal lock shaft, extends outwardly from the housing 1 and is located beneath the foot pedal 4. The foot pedal 4 is conventional and is mounted by the foot pedal hinge or pivot 12 to the floorboard. Extending outwardly from the housing 1 is a control lever 13 which is connected to the vertical ratchet member 5. The foot pedal lock shaft 20 is also connected to the vertical ratchet member 5. There are slots which are shown opposite 16 and 16a in FIG. 2 and FIG. 3 which permit both the bar 20 and the bar 13 to move upwardly and downwardly within the distance of 16 and 16a being the slots of the ratchet housing 1. The position of bar 13 is shown in dotted lines by 13a when it is in its lowest position. Similarly, the foot pedal lock shaft 20 is shown in its lowest position by the dotted lines indicated at 21. The displacement distance 16 is the amount of space that the control lever 13 moves to its position at 13a; and, similarly, the displacement distance 16a is the distance that the foot pedal lock shaft moves to its lowest position at 21.

A theftproof lock 17 comprises an assembly located opposite the ratchet teeth 14 on the vertical ratchet 5, being on the opposite side of the housing 1 from the aforesaid bars 13 and 20. The assembly 17 comprises a housing 7, a spring 18 mounted within the housing, and a horizontal bar 6 connected to the spring 18. The horizontal bar 6 engages the ratchet teeth 14 at 26. When the lock is not in position, there is a space 27 between the ratchet teeth 14 and the horizontal bar 6.

When the bar 6 engages the teeth 14, it travels a distance indicated by 25 in FIG. 4. The key 23 is shown as it appears in the gas pedal lock assembly 17 in the view of FIG. 4. When the vertical ratchet 5 is in the unlocked position, it is resting at the bottom of the housing 1 at 22 as seen in FIG. 3. When it is in the locked position, there is a space between the base 9 as can be seen in the view of FIG. 2.

The ratchet spring 19 is secured in the upper portion of the frame 8 which keeps tension against the ratchet bar 5 so that when the ratchet bar 5 is not locked, it will be kept in the position shown in view of FIG. 3 under tension of spring 19.

The housing 1 is a thin metal canopy covering the frame 8. The frame 8 comprises a rectangular shaped member, having an open space within its frame in the view of FIG. 2. The ratchet member 5 fits within the frame 8 and moves up and down therein, similar to a piston within a cylinder. The ratchet teeth 14 also move as the ratchet bar moves.

In operation, after the device has been secured to the floorboard and to the dashboard as disclosed by the bolts and rivets 11, and if it is desired to lock the gas pedal 4 into position so that it will not be able to be pushed down as shown at 21 in FIG. 3, the operator pulls up the arm on bar 13 to the position shown at 13a in FIG. 3 or at the position as shown by 13 in FIG. 2 so that bar 20 is in the position shown in FIG. 2 or by the dotted lines in FIG. 3 at 21. The operator then inserts the key 23 in the keyhole of the locking assembly 17, turns same in the conventional manner, causing the horizontal bar 6 to engage the teeth of the ratchet 14 as shown in the view of FIG. 2 at 26. The ratchet bar or piston 5 cannot move within the chamber of the frame 8. It is impossible, therefore, to operate the gas pedal 4 since the bar 20 obstructs the pedal 4 and prevents the pedal 4 from being pushed downwardly.

I claim:

1. A device for locking the position of an automobile foot gas-accelerator pedal, comprising a bar beneath the pedal, a chamber, an elongated slot in the chamber, a piston-type means within the chamber, said bar connected through said elongated slot to said piston-type means, means for raising or lowering the piston-type means, locking means for securing the height of the piston-type means whereby the bar is locked into position as determined by the means for raising and lowering the piston-type means, said means for raising and lowering the piston-type means comprising another bar located above the first-mentioned bar and elongated slot connected through a second slot to the piston-type means, said locking means for securing the height of the piston-type means comprising a plurality of ratchet teeth, means for engaging said ratchet teeth, means for locking said engagement means with said teeth whereby the position of the bar beneath the pedal is locked and cannot be moved.

2. A device for locking the position of an automobile foot gas accelerator pedal, comprising a bar beneath the pedal, a chamber, an elongated slot in the chamber, a piston-type means within the chamber, said bar connected through said elongated slot to said piston-type means, means for raising or lowering the piston-type means, locking means for securing the height of the piston-type means whereby the bar is locked into position as determined by the means for raising and lowering the piston-type means, said means for raising and lowering the piston-type means comprising another bar located above the first-mentioned bar and elongated slot connected through a second slot to the piston-type means, said piston-type means comprising a member within the chamber, a spring means located above said member between the top of the chamber and the top of the member, for exerting tension on the member to maintain said member in its lowest position within the chamber.

3. A device for locking the position of an automobile foot gas accelerator pedal, comprising a bar beneath the pedal, a chamber, an elongated slot in the chamber, a piston-type means within the chamber, said bar connected through said elongated slot to said piston-type means, means for raising or lowering the piston-type means, locking means for securing the height of the piston-type means whereby the bar is locked into position as determined by the means for raising and lowering the piston-type means, said means for raising and lowering the piston-type means comprising another bar located above the first-mentioned bar and elongated slot connected through a second slot to the piston-type means, said locking means for securing the height of the piston-type means comprising a plurality of ratchet teeth, means for engaging said ratchet teeth, means for locking said engagement means with said teeth whereby the position of the bar beneath the pedal is locked and cannot be moved, said piston-type means comprising a member within the chamber, a spring means located above said member between the top of the chamber and the top of the member, for exerting tension on the member to maintain said member in its lowest position within the chamber.

4. A device for locking the position of an automobile foot gas accelerator pedal comprising a bar beneath the pedal, a frame means, a chamber within the frame means, a piston member within the chamber, ratchet teeth formed on a portion of one edge of said piston member, a spring means mounted in said chamber at the top thereof, and connected to the top of said piston member so as to exert tension on said piston member, maintaining said member in its lowest position with the chamber, said bar connected to said piston member near its lowest portion in an area between the top and bottom of said pedal, a slot in said frame means through which said bar engages said piston member and moves up and down with the movement of said piston member, a second bar located substantially above said first bar, a second slot in said frame means enabling said second bar to pass therethrough to engage said piston member, a locking means operated by a key for locking said ratchet teeth into a fixed position whereby when the said second bar is pushed up against the tension of the spring forcing the piston member into its uppermost position with the first bar beneath the pedal, the turning of the key engages the ratchet teeth locking the piston member and the lower bar into a locked position.

* * * * *